United States Patent [19]
Smith

[11] 3,901,270
[45] Aug. 26, 1975

[54] ARTICULATED SUPPORT FOR HYDRAULIC HOSE

[75] Inventor: Roger M. Smith, Joliet, Ill.

[73] Assignee: Caterpillar Tractor Company, Peoria, Ill.

[22] Filed: Nov. 29, 1973

[21] Appl. No.: 420,064

[52] U.S. Cl. ............. 137/351; 137/355.17; 248/75; 285/114
[51] Int. Cl.² ......................................... B60D 1/08
[58] Field of Search .............. 248/75; 137/351, 615, 355.16, 137/355.17; 280/421; 285/114

[56] References Cited
UNITED STATES PATENTS

| | | | |
|---|---|---|---|
| 2,668,557 | 2/1954 | Hoelscher | 285/114 |
| 2,717,136 | 9/1955 | Greeson | 248/75 |
| 2,879,020 | 3/1959 | Wheeler | 248/75 |
| 3,279,822 | 10/1966 | Orendorff | 280/421 |
| 3,439,700 | 4/1969 | Preston | 137/351 |

Primary Examiner—Henry T. Klinksiek
Attorney, Agent, or Firm—Phillips, Moore, Weissenberger Lempio & Strabala

[57] ABSTRACT

An articulated support for flexible members such as hydraulic hoses, cables, and the like. The support is attached to one of two relatively movable members between which the hydraulic hose extends. The support has a first arm pivotally connected to the first member and a second arm pivotally connected to the first arm and to a hose supporting saddle and clamp means. The pivots between the first arm and the first member and the first arm and the second arm as well as between the second arm and saddle and clamp means have parallel pivot axes. When held by the instant articulated support, the hose is constrained to move in a plane normal to said pivot axes and is prevented from moving in a direction parallel to said pivot axes.

8 Claims, 3 Drawing Figures

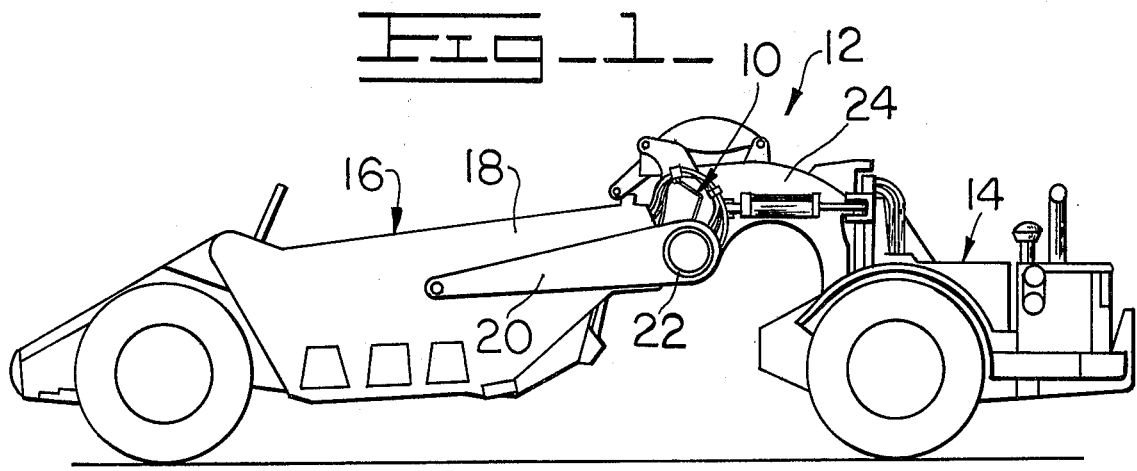
Fig_1_
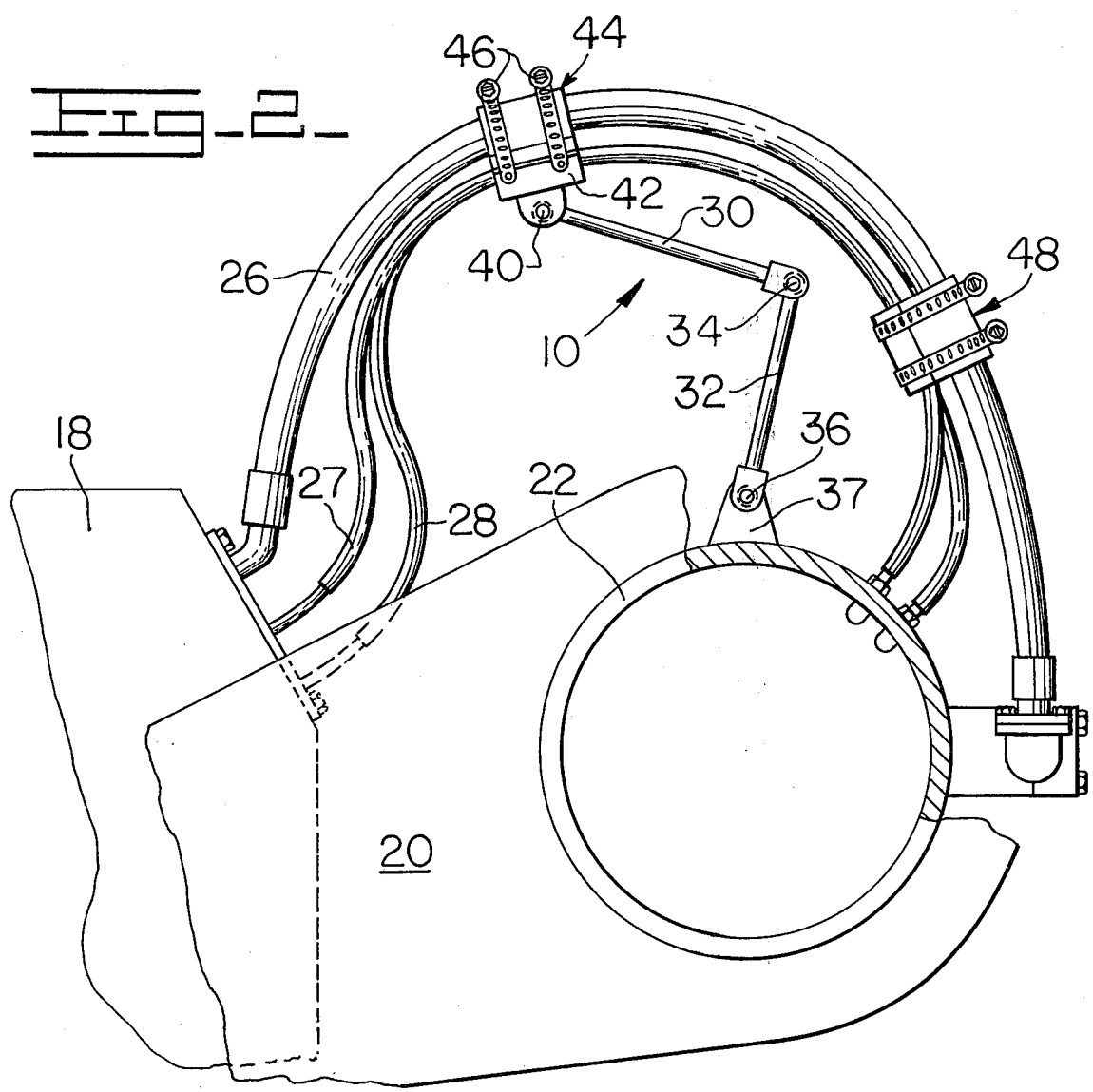
Fig_2_

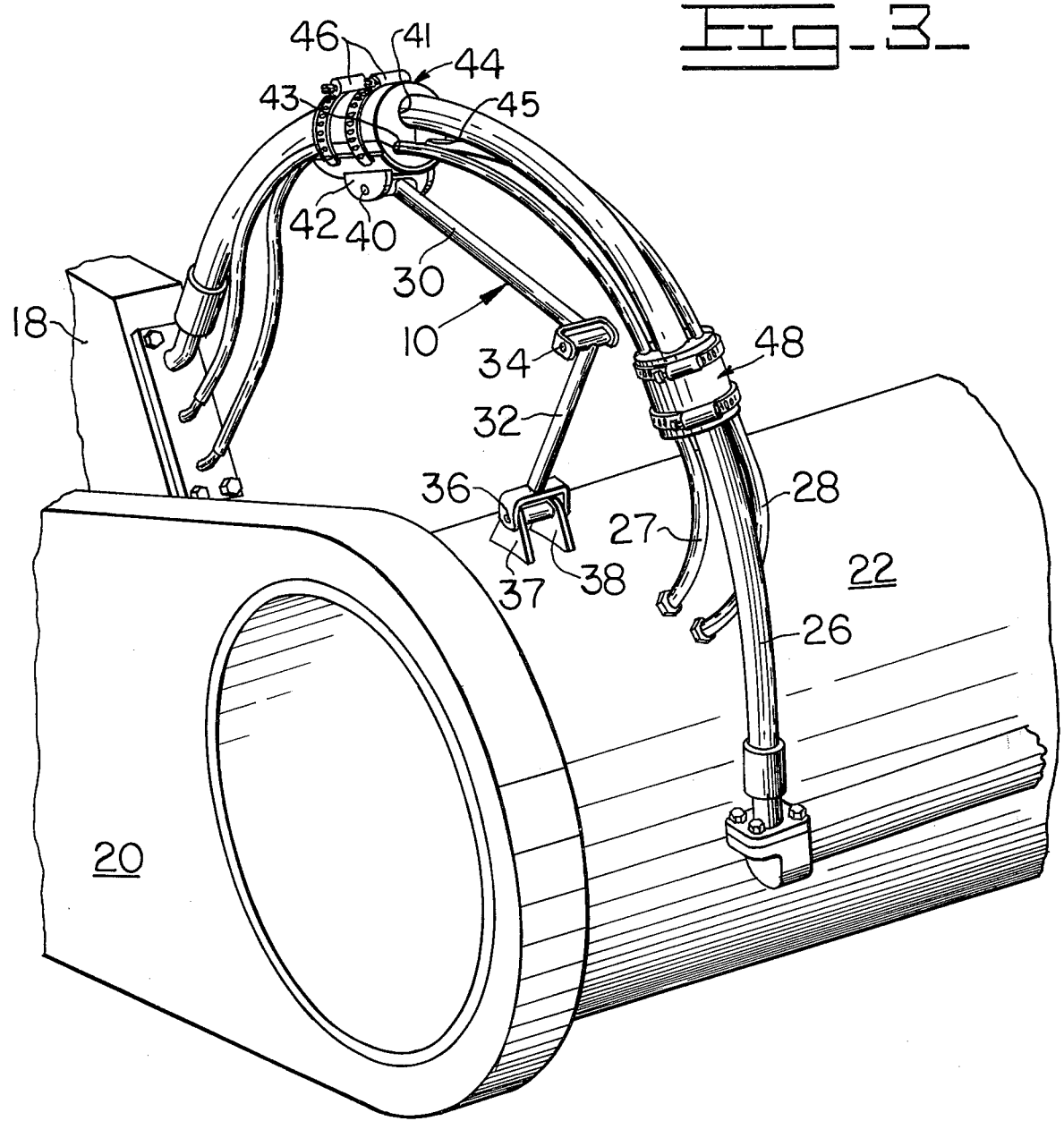
Fig_3_

ARTICULATED SUPPORT FOR HYDRAULIC HOSE

BACKGROUND OF THE INVENTION

Flexible members such as reinforced hydraulic hoses or cables are often placed across parts of machinery which move relative to each other. For example, in an earthmoving scraper vehicle, a plurality of hydraulic hoses for operating hydraulic jacks and the like extend between the engine carrying tractor portion and the scraper bowl portion which portions are articulated for steering purposes. Similar hoses extend between various relatively movable members of the scraper portion, per se. In such a vehicle, the relative movement between the members is often quite substantial and the hydraulic hoses must be configured in large loops or coils in order to accommodate such movement without undue hose wear or damage. Where the hose used in highly flexible, it is necessary to control the movement of such loops or coils when they are disposed in close proximity to moving parts in order to prevent damage thereto by abrasion or from stresses caused by twisting or tangling of the hoses.

Generally, it is important to constrain the hose loops for movement only in directions lying within the plane of such loops. Lateral movement, in a direction normal to the plane of the loops, would cause twisting and possible failure of the hose.

Some examples of prior art attempts to constrain or mount flexible members such as hoses are found in U.S. Pats. No. 2,619,888 to Young et al., U.S. Pat. No. 2,668,557 to Hoelscher, U.S. Pat. No. 3,085,135 to Brandin, U.S. Pat. No. 3,161,205 to Merker, U.S. Pat. No. 3,237,793 to De Puy, U.S. Pat. No. 3,412,951 to Ober, and U.S. Pat. No. 3,461,906 to Eckerle.

SUMMARY AND OBJECTS OF THE INVENTION

The instant invention provides a three piece articulated hose support arrangement for attachment to a hose or plurality of hoses extending between two relatively movable members. The support arrangement includes first and second articulated arms and a saddle mounting means all connected to a stable support portion of one of the movable members. The pivot connections for the support arrangement have parallel pivot axes. With the arrangement, the supported hose is constrained for movement only in a plane which intersects and is normal to such pivot axes.

An object of the present invention is to provide a mounting arrangement for a flexible hydraulic hose which has been formed into a loop and mounted between relatively movable parts of a scraper vehicle.

Another object of the present invention is to provide such a hose mounting arrangement which reduces the transmission to the hose loops of induced dynamic forces produced in such a vehicle.

A further object of the present invention is to provide such an arrangement for preventing a hose loop from fouling in adjacent moving parts of the vehicle and for protecting the hose from damage due to abrasion and impact.

A still further object of the present invention is to provide such mounting arrangement which includes a clamping means which accommodates the growth and contraction of hose diameter and loop size as the hose responds to increased and decreased internal pressure.

Still another object of the present invention is to provide a hose supporting arrangement including a hose tethering assembly having a pair of articulated arms, one of which is pivotally connected to a supporting member and the other of which is pivotally connected to a clamping means for a plurality of hoses in a manner which restrains the hoses from moving in all but one plane.

Other objects and advantages of the present invention will become apparent from the following description and drawings.

BRIEF DESCRIPTION OF THE DRAWINGS

FIG. 1 is a schematic elevation of an articulated earthmoving scraper vehicle embodying the present invention;

FIG. 2 is an enlarged partial elevation of the hose mounting arrangement applied to the vehicle in FIG. 1; and FIG. 3 is an enlarged isometric view of the hose mounting arrangement shown in FIG. 2.

DETAILED DESCRIPTION

With reference to the drawings, the instant articulated hose support arrangement is indicated generally at 10. The arrangement is shown applied to a scraper vehicle 12 having a tractor 14 articulately coupled to a scraper bowl 16. The scraper bowl 16 has a pair of laterally spaced side walls, one of which is shown at 18, each of which has a draft arm 20 pivotally connected thereto. The draft arms extend in parallel relation forwardly and are attached to opposite ends of a transversely or laterally extending spreader tube 22 which is mounted through a gooseneck 24 to the tractor 14.

With particular reference to FIGS. 2 and 3, a plurality of flexible hoses, 26, 27, 28, communicate hydraulic fluid from the spreader tube to the scraper bowl 16 for purposes such as operating hydraulic jacks and the like. Such hoses have one end thereof connected proximate one end of the spreader tube 22 and the other end thereof connected to an adjacent portion of the scraper bowl 16. The hoses are disposed in a large loop, as shown, for accommodating relative up and down movement between the spreader tube 22 and the scraper bowl with the parts as oriented in FIG. 1.

Side to side or lateral movement of the hose loop along the axis of the spreader tube is effectively eliminated by means of the present invention. The inventive support arrangement includes a first arm member 32 and a second arm member 30 pivotally connected to each other at 34. The pivot 34 has a pivot axis substantially parallel to that of the spreader tube 22. A proximal end of the first arm member 32 is pivotally connected at 36 to a pair of upstanding brackets 37 and 38 carried upon the spreader tube 22. The distal end of the second arm member 30 is pivotally connected at 40 to an arcuately shaped saddle member 42. The pivot axes of both the pivot connections 40 and 36 are substantially parallel to that of the spreader tube.

A cylindrically shaped, two-piece molded rubber bundling block 44 is supported upon the arcuately shaped saddle 42. The bundling block is provided with a plurality of molded apertures 41, 43 and 45, FIG. 3, for individually receiving the hoses 26, 27 and 28, respectively, in snug fitting relation therethrough. The bundling block and the hoses carried therein are secured to the saddle 42 by clamping strap means, such as a pair of adjustable hose clamps 46.

Additional bundling blocks and accompanying hose clamps may be used such as at 48 at intervals along the length of the hose for bundling the plurality of hoses together for additional control thereof.

It will be apparent from an examination of the drawings that the instant articulated hose support arrangement allows movement of the hose loops in only one direction, i.e., normal to the axes of the pivot connections 34, 36 and 40. Lateral movement of the hose loop, parallel to these axes, is effectively prevented.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. An articulated support arrangement for a flexible member extending between first and second relatively movable members and attached to each such movable member at first and second ends of said flexible member, said support arrangement including arm means pivotally connected to said first movable member for movement of said arm means within a first plane, said support arrangement further including clamping means for clamping and holding said flexible member, said clamping means including pivot connection means for connecting said clamping means to said arm means for movement of said clamping means only within said first plane, said arm means including first and second arm members, said first arm member being pivotally connected to said first movable member by a first pivot connection having an axis normal to said first plane, said second arm member and said first arm member being pivotally connected by a second pivot connection having a pivot axis normal to said first plane, said clamping means including an arcuately shaped saddle member for supporting a resilient bundling block member, said resilient bundling block member having means for resiliently holding said flexible member.

2. The invention of claim 1 wherein said first and second relatively movable members are components of an earthmoving scraper vehicle and said flexible member is a hydraulic hose.

3. The invention of claim 1 wherein said clamping means further include clamping strap means for fastening said bundling block member and said flexible member supported thereby to said saddle member, said pivot connection means including a third pivot connection having a pivot axis normal to said first plane for connecting said second arm member to said saddle member.

4. The invention of claim 3 wherein said support arrangement concurrently supports a plurality of flexible members and wherein said flexible members are hydraulic hoses.

5. The invention of claim 4 wherein said plurality of hoses are formed in a loop lying substantially entirely within said first plane.

6. The invention of claim 5 further including further clamping means not connected to said arm means including a further resilient bundling block and further clamping strap means for clamping and bundling said plurality of hoses together.

7. The invention of claim 1 wherein said resilient bundling block member is fabricated from rubber material.

8. The invention of claim 1 wherein said first pivot connection includes a pair of upstanding laterally spaced brackets and a pivot pin extending from one bracket to the other.

* * * * *

UNITED STATES PATENT AND TRADEMARK OFFICE
CERTIFICATE OF CORRECTION

PATENT NO. : 3,901,270
DATED : August 26, 1975
INVENTOR(S) : Roger M. Smith

It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-fourth Day of February 1976

[SEAL]

Attest:

RUTH C. MASON
*Attesting Officer*

C. MARSHALL DANN
*Commissioner of Patents and Trademarks*